United States Patent [19]

Batdorf et al.

[11] Patent Number: 4,762,387
[45] Date of Patent: Aug. 9, 1988

[54] ARRAY CONNECTOR FOR OPTICAL FIBERS

[75] Inventors: Robert L. Batdorf, Reading; Edmond J. Murphy, Bethlehem, both of Pa.; Tommy L. Poteat, Bridgewater; Jay R. Simpson, Fanwood, both of N.J.

[73] Assignee: American Telephone and Telegraph Company, AT&T Bell Laboratories, Murray Hill, N.J.

[21] Appl. No.: 832,166

[22] Filed: Feb. 21, 1986

[51] Int. Cl.$^4$ .............................................. G02B 6/36
[52] U.S. Cl. .................................. 350/96.2; 350/96.22
[58] Field of Search ............... 350/96.20, 96.21, 96.22, 350/96.30, 96.33

[56] References Cited

U.S. PATENT DOCUMENTS

| | | | |
|---|---|---|---|
| 4,164,363 | 8/1979 | Hsu | 350/96.17 |
| 4,179,189 | 12/1979 | Kaminow et al. | 350/96.33 |
| 4,213,670 | 7/1980 | Milton et al. | 350/96.16 |
| 4,217,032 | 8/1980 | Sheem | 350/96.21 |
| 4,529,426 | 7/1985 | Pleibel et al. | 65/3.11 |
| 4,639,074 | 1/1987 | Murphy | 350/96.2 X |

FOREIGN PATENT DOCUMENTS

| | | | |
|---|---|---|---|
| 0112706 | 7/1982 | Japan | 350/96.2 |
| 0158824 | 9/1982 | Japan | 350/96.2 |
| 0169112 | 10/1983 | Japan | 350/96.2 |

OTHER PUBLICATIONS

"Single-Mode Fiber-to-Channel Waveguide Coupling", *J. Opt. Comm.*, vol. 2, No. 4, 1981, Ramer, pp. 122–127.

"Experimental Integrated Optic Circuit . . . " IEEE J. Quantum Elect., vol. QE-17, No. 6, Jun. 1981, Ramer et al., pp. 970–974.

"Fabrication of Flip-Chip . . . ", *IEEE Trans. on Comp. Hybrids and Manuf. Tech*, vol. CHMT-4, No. 4, Dec. 1981, Bulmer et al., pp. 350–355.

*Primary Examiner*—John Lee
*Assistant Examiner*—John Ngo
*Attorney, Agent, or Firm*—Wendy W. Koba

[57] ABSTRACT

An array connector for optical fibers is disclosed which utilizes a plurality of grooves formed in the array substrate to hold the fibers. The connector is to be used with fibers having at least one sectional view substantially flattened side, where polarization maintaining fibers may be formed to assume this shape. The grooves are formed to have a relatively flat bottom surface so that the flattened side of the fiber is positioned to coincide with this flat bottom surface. The grooves themselves may have any desired cross section. A coverplate with corresponding grooves may be utilized to form an interlocking structure to prevent any lateral movement by the fibers. When used in association with polarization maintaining fibers, the connector of the present invention will preserve the polarization through the connection by preventing any axial angular motion. The connector may be used to align a plurality of fibers with another plurality of fibers or, alternatively, with a plurality of optical waveguides.

24 Claims, 2 Drawing Sheets

ARRAY CONNECTOR FOR OPTICAL FIBERS

BACKGROUND OF THE INVENTION

1. Field of the Invention

The present invention relates to an array connector for optical fibers and, more particularly, to such a connector suitable for providing fiber-to-fiber array connections or, alternatively fiber array-to-waveguide connections.

2. Description of the Prior Art

Packaging has become a key issue in evaluating the manufacturability and reliability of optical devices. A significant part of the packaging problem is due to the stringent alignment tolerances required between devices and optical fibers. To date, most applications have required the alignment of only a single fiber. However, with the advent of integrated optical devices, the need has arisen to align linear arrays of fibers to either other arrays of fibers, or an array of waveguides. U.S. Pat. No. 4,217,032 issued to S. K. Sheem on Aug. 12, 1980, discloses one array alignment technique utilizing a two-dimensional intersecting groove pattern and an alignment fiber. U.S. Pat. No. 4,164,363 issued to H. Hsu on Aug. 14, 1979 discloses an alternative technique especially suited for aligning single mode fibers to waveguides. A problem with these and other alignment techniques is the fact that there exist six possible degrees of freedom which must all be aligned. An alternative prior art technique which discloses an arrangement for automatically aligning five of the six possible degrees of freedom is disclosed in U.S. Pat. No. 4,639,074 issued Jan. 27, 1987 to; this inventor and assigned to the same assignee as the present application. As disclosed in this patent, the fiber arrays are held in V-grooves etched in a silicon substrate, where the silicon substrate overlaps the top surface of the mating array. Although this method is useful in achieving array alignment in most applications, it is difficult to employ in situations where polarization maintaining fiber is used, since this particular type of fiber will not necessarily mate and align properly with the V-groove structure.

Polarization maintaining fiber with very low loss and excellent polarization holding ability has been produced by a variety of techniques. One exemplary technique is disclosed in U.S. Pat. No. 4,529,426 issued to W. Pleibel et al on July 16, 1985. As disclosed, high birefringence is introduced into the fiber preform by deforming the preform such that a cladding layer becomes significantly flattened while the core region remains hard and substantially round. Upon being drawn into a fiber, the cladding retains its flattened ellipsoid form as is illustrated in FIGS. 3-5 of Pleibel et al. The availability of this fiber provides significant new potential for optical communication systems, integrated optics and fiber based sensors. In particular, coherent communications systems require control and maintenance of the state of polarization. Therefore, to facilitate the use of polarization maintaining fiber, arrangements for connecting these fibers to waveguides or other devices is required. It is important to note that unlike conventional connectors, axial angular alignment must be maintained so as to properly orient and preserve the state of polarization as it passes through the connection.

SUMMARY OF THE INVENTION

The present invention relates to an array connector for optical fibers and, more particularly, to such a connector suitable for use with polarization maintaining fiber to provide fiber-to-fiber array connections or, alternatively, fiber array-to-waveguide connections. Unlike prior art connectors, the array connector of the present invention is capable of automatically aligning the fibers and thus preserving the state of polarization of the signal passing through the connection.

It is an aspect of the present invention to utilize a support substrate, (for example, a silicon chip) with etched grooves, these grooves having a sufficiently flat bottom surface to hold an array of polarization maintaining fibers, where the elongated ellipsoid cross section of the polarization maintaining fiber will keep the fiber from rotating and thus losing orientation of its polarization axis.

Another aspect of the present invention is to provide an array connector suitable for use with any type of fiber having an elongated cross-section. For example, it is possible to form either a single mode optical fiber or polarizing fiber (a fiber which guides only one polarization) with this type of cross-section.

Yet another aspect of the present invention is to provide a connector arrangement which is equally applicable to aligning arrays of fibers to other fiber arrays, as well as to align arrays of fibers to waveguide arrays.

A further aspect of the present invention is to provide for self-orienting of the polarization axis associated with polarization maintaining fibers during array assembly to eliminate the need to interactively align the polarization axis for each fiber in the array.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
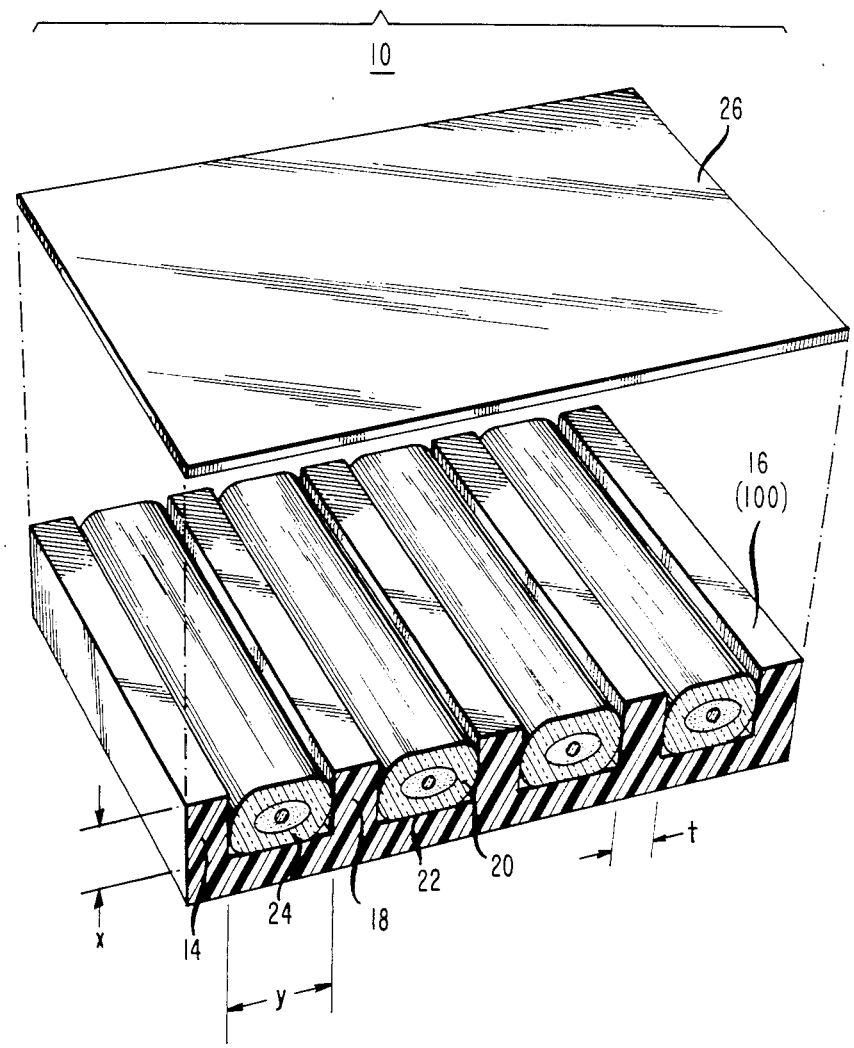
FIG. 1 illustrates an exemplary array connector for optical fibers formed in accordance with the present invention which utilizes rectangular shaped grooves to separate the individual fibers.

FIG. 1 illustrates an exemplary array connector 10 capable of providing fiber-to-fiber or fiber-to-waveguide connections in accordance with the present invention. In particular, array connector 10 comprises a plurality of rectangular grooves 12 formed in a substrate 14, where substrate 14 may comprise a silicon chip, plastic, ceramic, or any other suitable material. For the sake of discussion, substrate 14 will be referred to hereinafter as a silicon chip. Rectangular grooves 12 may be formed by creating a properly aligned etch pattern on top surface 16 of silicon chip 14 and etching the (100) surface 16 of chip 14. Silicon chip 14 is then etched in a solution capable of dissolving the silicon, for example, potassium hydroxide, for a period of time sufficient to etch the grooves to a predetermined depth x. The depth x of grooves 12 is determined to be greater than one-half the width, but less than the full width, of the associated fiber. The posts 18 remaining at the end of the etch process are separated by a sufficient distanced y, as determined by the etch pattern, to allow placement of the elongated fiber in grooves 12. The thickness t of posts 18 is preferably in the range of 10–50 μm, where this thickness has been found to prevent posts 18 from breaking off of chip 12 during assembly, while allowing a maximum number of grooves to be formed in a single chip 14. After grooves 12 are formed, the fibers are placed in array connector 10 such that the elongated side 22 of the fibers 20 coincides with the relatively flat bottom surface 24 of grooves 12. The array may then be held together with an adhesive and polished at its end face to form the final connector 10.

Figure 2:
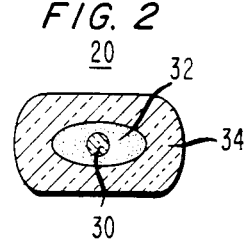
FIG. 2 illustrates, in a cross-sectional view, an exemplary polarization maintaining fiber which may be utilized in the array connector of the present invention.

As mentioned above, array connector 10 of the present invention may be most advantageously utilized in connecting an array of polarization maintaining fibers to either another fiber array or, alternatively, to an array of optical waveguides. In order to maintain the axial angular alignment of polarization maintaining fibers 20 in array connector 10, the elongated sides 22 of flattened elliptical cross-section fibers 20, as shown in detail in FIG. 2, are placed in contact with bottom surfaces 24 of grooves 12. A cover plate 26 is placed on top of the structure, as shown, to prevent any motion of the fibers. An alternative form of cover plate 26 will be discussed below in association with FIG. 3.

An exemplary polarization maintaining fiber 20 which can be used in conjunction with array connector 10 of the present invention is illustrated in a cross-sectional view in FIG. 2. Fiber 20 may comprise a round silica core 30, an extremely ellipitcal stress cladding layer 32 (comprising boron and germanium doped silica), and a flattened outer cladding layer 34 (comprising flourine-doped silica). A complete description of the polarization maintaining qualities of this particular fiber may be found in U.S. Pat. No. 4,529,426 issued to W. Pleibel et al on July 16, 1985. In general, however, the polarization axes of the light traveling through a polarization maintaining fiber as disclosed by Pleibel et al are parallel with an orthogonal to the elongated side 22 of fiber 20, as indicated by the arrows shown in FIG. 2. Therefore, once elongated side 22 of fiber 20 is placed along the bottom surface 24 of groove 12, the polarization axes of the light will remain fixed in these indicated directions.

Figure 3:
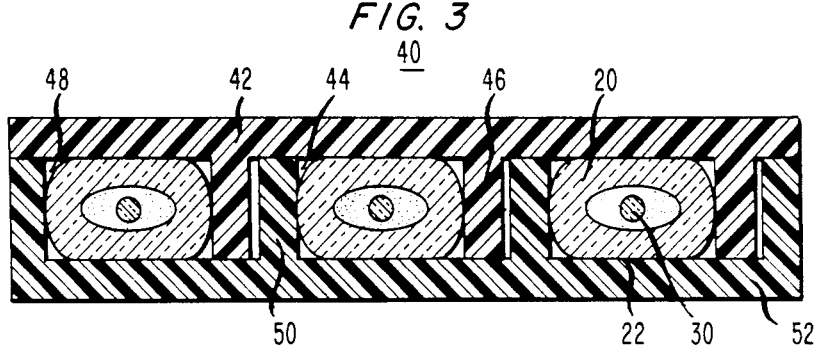
FIG. 3 illustrates an alternative arrangement similar to FIG. 1 where rectangular divisions are also formed on a separate cover plate to further restrict the movement of fibers.

As mentioned above, flat cover plate 26 of array connector 10 of FIG. 1 may be replaced by an alternative arrangement. Once such alternative is illustrated in FIG. 3, which shows in a cross-sectional view an alternative array connector 40. A cover plate 42 is illustrated as comprising a plurality of grooves 44 and posts 46 which are capable of interlocking with the grooves 48 and posts 50 formed on a silicon chip 52. Grooves 44 may be formed in cover plate 42 using a similar process as described above in association with the formation of grooves 12 in silicon chip 10. The interlocking embodiment of FIG. 3 thus prevents any lateral motion of fibers 20 in grooves 48, and may aid in aligning array connector 40 to the associated connecting fiber or waveguide array (not shown).

Figure 4:
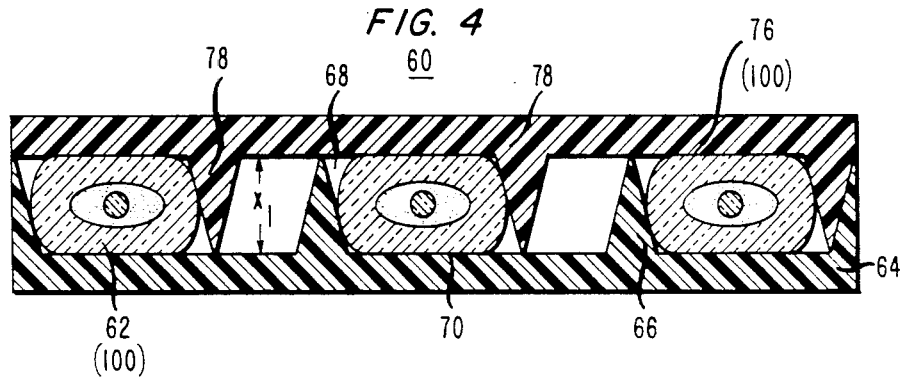
FIG. 4 illustrates yet another embodiment of the present invention where triangular divisions are used to separate the individual fibers.

FIG. 4 illustrates yet another alternative array connector 60 formed in accordance with the present invention for providing either fiber-to-fiber or fiber-to-array connections. In this embodiment, the (100) surface 62 of a silicon chip 64 is etched as described above. However, etching along this surface will create a plurality of triangular-shaped posts 66, instead of rectangular posts 18 and 46 as shown in FIGS. 1 and 3. The plurality of grooves 68 formed in silicon chip 64 still comprise a relatively flat bottom surface 70 and thus provide a sufficient reference surface for the elongated side 22 of fiber 20. As with the formation of grooves 12 in silicon chip 14, the (100) surface 62 of silicon chip 64 is etched for a period of time to create grooves 68 of a depth $x_1$ less than the full width of fiber 20, but greater than half of this width. In a similar fashion as connector 40 of FIG. 3, connector 60 may be modified to include a coverplate 72 using triangular divisions 74 to form an interlocking structure. Coverplate 72 may simply be formed by etching the (100) surface 76 of a silicon chip 78 using the method described above.

Figure 5:
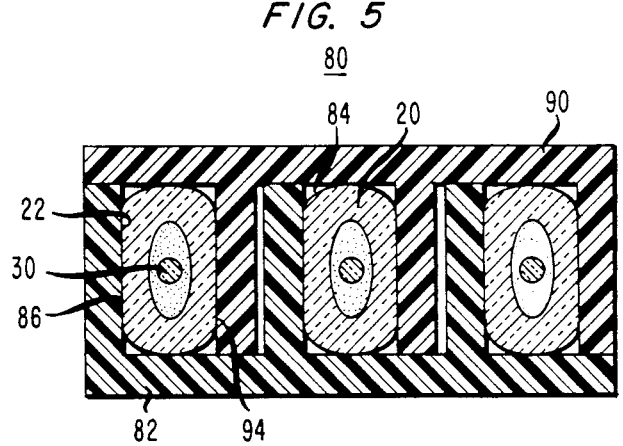
FIG. 5 illustrates an alternative embodiment similar to FIG. 3 where the fibers are rotated 90° to position the elongated fiber sidewall along the side of the groove.

In some configurations, it is desirable to position fiber 20 with core region 30 rotated 90° from its position as illustrated in the embodiments discussed above. In particular, when aligning fibers between two devices, for example, a laser source and an integrated optic device, it may be extremely beneficial to rotate the plane of polarization by 90°. For these situations, a connector with rectangular grooves, similar to connector 40 shown in FIG. 3, may be used where fibers 20 are rotated 90° so that elongated sidewalls 22 are in contact with the sidewalls of the grooves. An exemplary connector 80 illustrating this arrangement is shown in FIG. 5. A substrate 82 is etched to include a plurality of rectangular grooves 84. Fibers 20 are positioned so that elongated sidewalls 22 are placed against vertical sidewalls 86 of grooves 84. To maintain fiber array 20 in this position, a coverplate 90 with rectangular grooves 92 is disposed to mate with substrate 82 such that vertical sidewalls 94 of grooves 92 are positioned against opposing elongated sidewalls 96 of fiber 20.

It is to be understood that the grooved array connector of the present invention, although described above as a connector for polarization maintaining fibers, can be utilized with any fiber formed to comprise elongated sides. For example, it is possible to form single mode optical fiber with a cross-section similar to that illustrated in FIG. 2. It is clearly beneficial to utilize the array connector of the present invention with this type of single mode fiber in order to preserve the integrity of the signal as it passes through the fiber and into the ajoining fiber or waveguide.

What is claimed is:

1. A polarization maintaining optical fiber connector comprising
    at least one input polarization maintaining optical fiber, said at least one input polarization maintaining optical fiber having a cross-section including at least one elongated sidewall;
    at least one output polarization maintaining fiber, said at least one output polarization maintaining fiber having a cross-section including at least one elongated sidewall; and
    a substrate including at least one groove formed in a top surface thereof, said at least one groove comprising a relatively flat bottom surface for accommodating the elongated sidewalls of both said at least one input and said at least one output polarization maintaining optical fibers.

2. A polarization maintaining optical fiber connector as defined in claim 1 wherein the at least one groove is formed to a predetermined depth below the top surface of the substrate, said predetermined depth being greater than one-half the width, but less than the full width of the at least input one polarization maintaining optical fiber.

3. A polarization maintaining optical fiber connector as defined in claim 1 wherein the at least one input polarization maintaining optical fiber and the at least one output polarization maintaining optical fiber each comprise a plurality of polarization maintaining optical fibers and the substrate comprises an associated plurality of relatively flat-bottomed grooves.

4. A polarization maintaining optical fiber connector as defined in claim 1 or 3 wherein each groove comprises a rectangular cross section.

5. A polarization maintaining optical fiber connector as defined in claim 4 wherein each rectangular groove comprises substantially vertical sidewalls capable of accommodating the elongated sidewalls of the at least one optical fiber when said elongated sidewall is positioned in contact with said rectangular groove vertical sidewall.

6. A polarization maintaining optical fiber connector as defined in claim 1 or 3 wherein each groove comprises outwardly inclining sidewalls.

7. A polarization maintaining optical fiber connector as defined in claim 1 or 3 wherein the connector substrate comprises silicon and each groove is etched into the top surface of said silicon substrate.

8. A polarization maintaining optical fiber connector as defined in claim 7 wherein the top surface of the silicon substrate comprises the (110) surface of said silicon, whereby each groove comprises a rectangular cross section.

9. A polarization maintaining optical fiber connector as defined in claim 7 wherein the top surface of the silicon substrate comprises the (100) surface of said silicon, whereby each groove comprises outwardly inclining sidewalls.

10. A polarization maintaining optical fiber connector as defined in claim 1 or 3 wherein the connector further comprises a coverplate disposed over and in contact with the top surface of the substrate.

11. A polarization maintaining optical fiber connector as defined in claim 10 wherein the coverplate comprises a relatively flat major surface in contact with the substrate.

12. A polarization maintaining optical fiber connector as defined in claim 10 wherein the coverplate surface in contact with the substrate comprises at least one groove formed in a top major surface for interlocking with said substrate.

13. A polarization maintaining optical fiber connector as defined in claim 12 wherein the at least one groove comprises a plurality of grooves equal to the number of grooves formed in the substrate for completely interlocking said coverplate with said substrate.

14. A polarization maintaining optical fiber connector as defined in claim 13 wherein each coverplate groove comprises a rectangular cross section.

15. A polarization maintaining optical fiber connector as defined in claim 13 wherein each coverplate groove comprises outwardly inclining sidewalls.

16. A polarization maintaining optical fiber connector as defined in claim 13 wherein the coverplate comprises silicon and each coverplate groove is etched into the top major surface of said silicon substrate.

17. A polarization maintaining optical fiber connector as defined in claim 16 wherein the top major surface of the silicon coverplate comprises the (110) surface of said silicon, thus forming rectangular cross section grooves.

18. A polarization maintaining optical fiber connector as defined in claim 16 wherein the top major surface of the silicon coverplate comprises the (100) surface of said silicon, thus forming outwardly inclining sidewalls for each groove.

19. A polarization maintaining optical fiber connector capable of joining at least one polarization maintaining optical fiber to either an optical fiber or an optical waveguide, said at least one polarization maintaining fiber having a cross-section including at least one elongated sidewall, said polarization maintaining optical fiber connector comprising a substrate including at least one groove formed in a top surface, said at least one groove comprising a relatively flat bottom surface capable of accommodating the elongated sidewall of said at least one polarization maintaining optical fiber; and a coverplate disposed over and in contct with the top surface of said substrate, said coverplate including a plurality of grooves equal to the number of grooves formed in the substrate for completely interlocking said coverplate with said substrate.

20. A polarization maintaining optical fiber connector as defined in claim 19 wherein each coverplate groove comprises a rectangular cross-section.

21. A polarization maintaining optical fiber connector as defined in claim 19 wherein each coverplate groove comprises outwardly inclining sidewalls.

22. A polarization maintaining optical fiber connector as defined in claim 19 wherein the coverplate comprises silicon and each coverplate groove is etched into the top major surface of said silicon substrate.

23. A polarization maintaining optical fiber connector as defined in claim 22 wherein the top major surface of the silicon coverplate comprises the (110) surface of said silicon, thus forming rectangular cross-section coverplate grooves.

24. A polarization maintaining optical fiber connector as defined in claim 22 wherein the top major surface of the silicon coverplate comprises the (100) surface of said silicon, thus forming outwardly inclining sidewalls for each coverplate groove.

* * * * *

UNITED STATES PATENT AND TRADEMARK OFFICE
CERTIFICATE OF CORRECTION

PATENT NO. : 4,762,387

DATED : August 9, 1988

INVENTOR(S) : R. L. Batdorf, E. J. Murphy, T. L. Poteat, J. R. Simpson

It is certified that error appears in the above-identified patent and that said Letters Patent is hereby corrected as shown below:

In the Claims, Claim 5, Column 5, Line 24,

"optical fiber" should read

--polarization maintaining optical fiber--.

Signed and Sealed this

Third Day of January, 1989

Attest:

DONALD J. QUIGG

Attesting Officer

Commissioner of Patents and Trademarks